Sept. 15, 1964    J. M. PLOTT    3,148,718
NUT CRACKER
Filed July 31, 1962
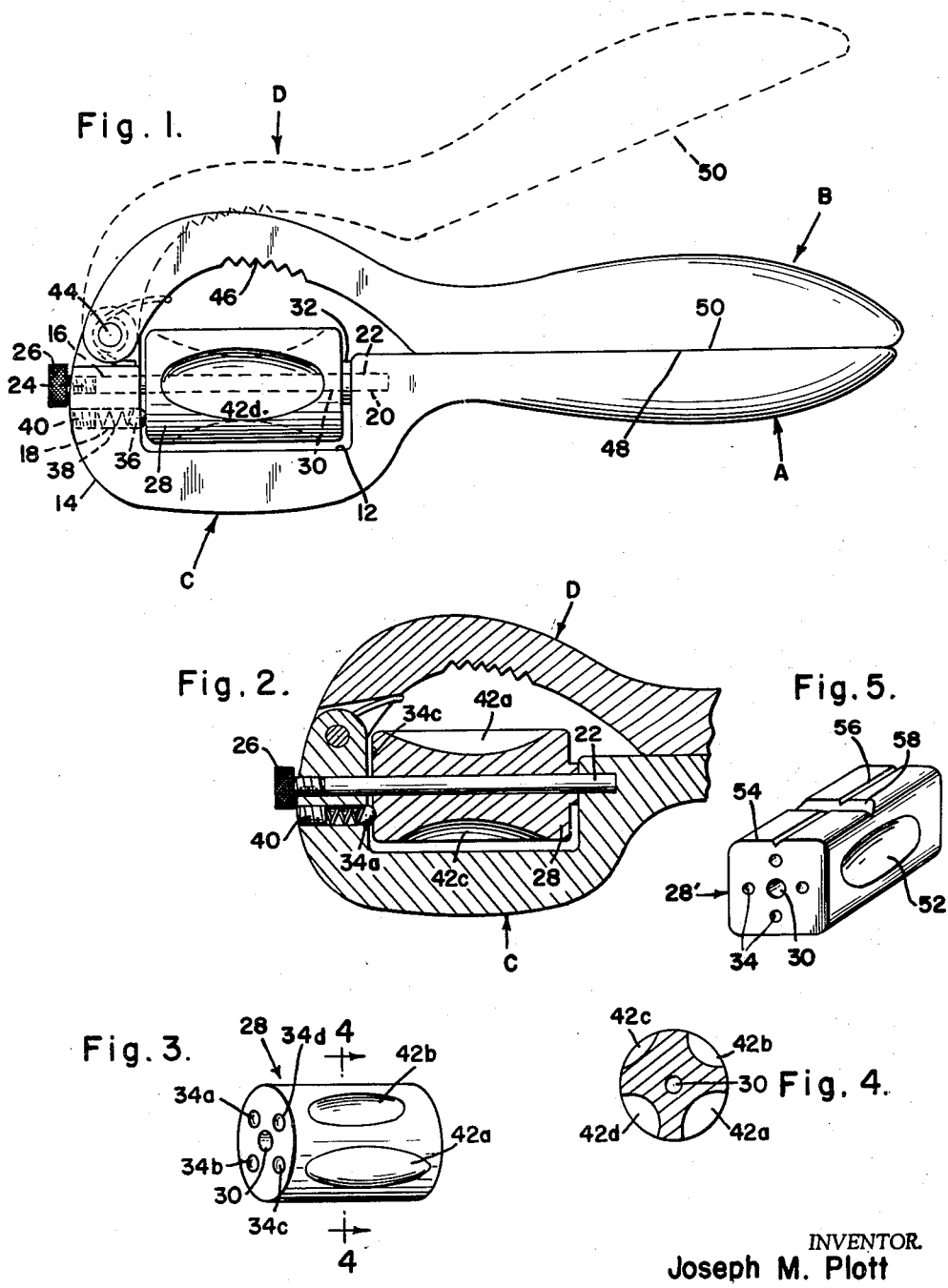
INVENTOR.
Joseph M. Plott
BY
Townsend and Townsend
attorneys

United States Patent Office 3,148,718
Patented Sept. 15, 1964

3,148,718
NUT CRACKER
Joseph M. Plott, 1393 Stephen Way, San Jose, Calif.
Filed July 31, 1962, Ser. No. 213,766
5 Claims. (Cl. 146—13)

This invention relates to an improved nut cracker, and more particularly to a nut cracker that is capable of cracking the shell of a nut without breaking the meat contained in the shell.

Enjoyment in eating nuts is promoted if the meat of the nut can be rapidly and conveniently extracted from the nut shell. Because the shell of a nut is usually much harder than the nut meat, care must be taken when cracking the shell not to break or shatter the meat. In the use of prior art nut crackers of which I have knowledge, it is difficult to crack the shell without breaking the nut meat because the shell yields so suddenly that the user of the nut cracker can not readily control the compressive force exerted by his hand on the apparatus. To overcome this problem, various types of adjusting devices have been provided. These usually comprise exposed threaded members or springs which become coated with particles of nut shells during operation. The foregoing is not only unsanitary but makes proper adjustment of the nut cracker difficult. Moreover, such prior art devices apart from the hindering effect of the shell particles, do not retain the same adjustment over an extended period of use because the threaded members will rotate a slight amount each time a nutshell is cracked.

It is therefore an object of the present invention to provide a nut cracker that is free from the aforementioned shortcomings.

Another object is to provide a nut cracker having two movable jaws in which one jaw has a member formed with a number of different sized depressions or concavities on the surfaces thereof and is arranged so that the movement of the other jaw toward the depressions is limited to a fixed amount. Fulfillment of this object permits the shells of different sized nuts to be cracked without breaking the meat. Adjustment of the jaw clearance for different sized nuts is rapidly effected by rotating the depression forming member to present a proper sized depression appropriately spaced relatively to the opposite jaw. The adjustment will not change until change is desired, since the depression forming member can be locked in position.

A feature and advantage of the present invention is that the depression or cavity in one jaw forms a bed which will hold a nut without requiring manual support of the nut by a user of the device. The lower surface of the bed is fixed relative the other jaw to eliminate excessive pressure on the nut meat when the shell yields.

Another object and advantage of the within invention is to provide a nut cracker having first and second arms joined for relative pivotal movement in which the first arm is formed with an excised portion shaped to receive a generally cylindrical member. This cylindrical member has plural nut receiving concavities of different depths formed in the surface thereof. Means is provided for rotatably mounting the cylindrical member in the excised portion of said first arm. Also provided is means for releasably locking the cylindrical member against rotation so that each of the cavities can be selectively disposed by the second arm. The second arm is formed with a nut crushing jaw adapted for movement towards and away from the cylindrical member. Means is provided for limiting the movement that the jaw can be moved toward a selected concavity in the cylindrical member to a distance sufficient to crack the nut shell disposed in the concavity but insufficient to break the meat of the nut.

These and other objects, features and advantages will be more apparent after referring to the following specifications and attached drawings.

In the drawings:

FIG. 1 is a side elevation view of a nut cracker made in accordance with my invention;

FIG. 2 is a cross-sectional side elevation view of the jaws of my improved nut cracker;

FIG. 3 is a perspective view of the depression forming member of my improved nut cracker;

FIG. 4 is a cross-sectional view taken substantially along line 4—4 of FIG. 3; and, FIG. 5 is a perspective view of a modified depression forming member of the invention.

Referring more particularly to the drawings, arms A and B are pivotally joined at one end thereof, so that jaws C and D on respective arms move toward and away from one another responsive to the movement of the arms. A nut disposed within jaws C and D will have the shell cracked by the closure of arms A and B.

Jaw C of arm A has an excised portion 12 therein opening upwardly toward jaw D. An end-wall portion 14 is formed thereby and has holes 16 and 18 therein. On the opposite side of excised portion 12 a hole 20 is provided in axial alignment with hole 16 and a shaft 22 is supported at opposite ends thereof in holes 16 and 20. The outer end of hole 16 is provided with a threaded portion 24; a thumbscrew 26 is threadably engaged in threaded portion 24 to retain shaft 22 in place.

Mounted on shaft 22 for rotation within excised portion 12 is a cylindrical member 28 having a longitudinal hole 30 therethrough along the axial center of the cylindrical member. Also mounted on shaft 22 is a thrust washer 32 between the end of cylindrical member 28 and an inner face of excised portion 12.

Cylindrical member 28 is releasably locked in any one of a plurality of rotational positions by a detent mechanism that includes a plurality of depressions 34a, 34b, 34c, and 34d in one longitudinal end of cylindrical member 28 (FIG. 3) and a ball 36 in hole 18 urged into one of the depressions by a compression spring 38. A set screw 40 is provided for retaining ball 36 and spring 38 in place. Associated with each hole 34a, 34b, 34c, and 34d and lying in the surface of cylindrical member 28 are respective concavities 42a, 42b, 42c and 42d. Each concavity 42a, 42b, 42c, and 42d is of a different size and depth so that rotation of cylindrical member 28 causes a different depression to be disposed opposite jaw D for each position of the cylindrical member.

The top of wall portion 14 of arm A is formed to receive a shaft 44 that is provided for pivotal attachment of arm B to arm A. Jaw D of arm B can be provided with a roughened surface 46 on the surface that is opposite cylindrical member 28. A spring 48 is provided for biasing jaw D away from jaw C to expedite placement of a nut into one of concavities 42.

In operation the proper concavity 42a, 42b, 42c, or 42d is selected by rotating cylindrical member 28, and the proper cavity is held in an upward position opposite jaw D by the detent mechanism. The nut is then placed in the upwardly opening concavity 42 and arm B is moved toward arm A which movement causes jaw D to move toward the nut. The amount of movement is restricted by opposing flat surfaces 48 and 50 on jaws A and B. Thus when the size of concavity 42 is chosen in accordance with the size of the nut, only the nut shell will be cracked, and the meat will be intact for consumption.

The embodiment of my invention described hereinabove has provision for four different sized nuts. Greater versatility is readily obtainable. For example, thumb screw 36 can be removed to permit removal of shaft 22 whereupon a different cylindrical member 28' may be inserted within excised portion 12. Cylindrical member 28' has three depressions but only one depression 52 is visible in FIG. 5. It is to be understood that those depressions not shown are similar to concavity 52 except they have a different shape and size. The fourth or upper face 54 of cylindrical member 28' is formed with intersecting V-grooves 56 and 58. V-groove 56 extends longitudinally of cylindrical member 28' and V-groove 58 extends transversally thereof. The V-grooves are particularly useful in cracking Brazil nuts because the sharp edges of the shell can be readily placed into one of the grooves, and the operation of the device continued as described above. Because V-groove 58 is wider and deeper than V-groove 56, larger nuts can be cracked in groove 58.

Cylindrical member 28' is shown as having a generally rectangular cross-section with rounded edges, it being understood that this is only exemplary and that the cylindrical member can be round or any suitable shape. Although each of the cylindrical members described above has four working surfaces any different number of surfaces can be included.

Thus I have provided a nut cracker that is rapidly adjustable to accommodate various sizes and types of nuts, and which can crack the shells of such nuts without destroying the nut meat because cooperation of faces 48 and 50 of arms A and B limit the distance that jaw D can approach jaw C. Moreover the device is versatile in that various cylindrical members 28 and 28' can be placed within excised portion 12 to permit preparation of nuts of many different sizes. The disassembly feature is also important in that it permits the device to be satisfactorily cleaned.

While two embodiments of my invention have been shown and described, it will be apparent that other adaptations and modifications may be made without departing from the spirit and scope of the invention.

What is claimed is:

1. In a nut cracker of the type in which a pair of jaws are adapted to be moved toward one another to crack the shell of a nut the improvement comprising a generally cylindrical member having a plurality of different sized nut receiving concavities on the surface thereof, means for rotatably mounting said cylindrical member on one of the jaws, means for releasably locking said cylindrical member against rotation so that each of said cavities can be selectively disposed opposite the other jaw, and means for limiting movement of the last mentioned jaw toward the concavity to a distance sufficient to crack the shell of the nut disposed in a concavity but insufficient to crack the meat of the nut.

2. A nut cracker comprising first and second arms joined for relative pivotal movement, said first arm being formed with an excised portion, a generally cylindrical member shaped to be received in said excised portion, said cylindrical member having a plurality of nut receiving concavities of different depths in the surface thereof, means for rotatably mounting said cylindrical member in said excised portion, said second arm being formed with a jaw for movement toward and away from said cylindrical member, and means for limiting the distance that said jaw can be moved toward a selected concavity in said cylindrical member to an amount sufficient to crack the shell of a nut disposed in said concavity and insufficient to break the meat of the nut.

3. A nut cracker according to claim 2 and wherein said cracker includes means for releasably locking said cylindrical member against rotation so that each of said cavities can be selectively disposed opposite said second arm.

4. A nut cracker comprising first and second arms joined for relative pivotal movement, said first arm being formed with an excised portion, a generally cylindrical member shaped to be received in said excised portion, said cylindrical member having a plurality of nut receiving concavities of different depths in the surface thereof, and a longitudinal hole therethrough along the axial center thereof, a shaft extending through said excised portion and through the hole in said cylindrical member to mount said cylindrical member for rotation within said excised portion, a detent mechanism for releasably locking said cylindrical member in any one of a plurality of rotational positions corresponding to the plural concavities in said cylindrical member, and means for fixing the distance that said second jaw can be moved toward said first jaw whereby the distance between said second jaw and said concavities can be varied by rotation of said cylindrical member to different rotational positions.

5. A nut cracker comprising first and second arms joined for relative pivotal movement, said first arm being formed with an excised portion, a generally cylindrical member shaped to be received in said excised portion, said cylindrical member having a first side defining a first concavity, a second side defining a second concavity, said second concavity being larger than said first concavity, a third side defining a third concavity, said third concavity being larger than said second concavity, and a fourth side formed with an elongated groove therein, and means for rotatably mounting said cylindrical member in said excised portion, means for releasably locking said cylindrical member against rotation so that each of said faces can be selectively disposed opposite said second arm, said second arm being formed with a jaw for movement toward and away from said cylindrical member, and means for limiting the distance that said jaw can be moved toward selected faces in said cylindrical member to an amount sufficient to crack the shell of a nut disposed on said face and insufficient to break the meat of the nut.

References Cited in the file of this patent

UNITED STATES PATENTS

| | | |
|---|---|---|
| 1,219,859 | Paxton | Mar. 20, 1917 |
| 1,710,629 | Lindsey | Apr. 23, 1929 |